W. H. HAWLEY.
Axle and Shaft.

No. 96,318. Patented Nov. 2, 1869.

Witnesses:

Inventor,
William H. Hawley

United States Patent Office.

WILLIAM H. HAWLEY, OF UTICA, NEW YORK.

Letters Patent No. 96,318, dated November 2, 1869.

IMPROVEMENT IN AXLES AND SHAFTS.

The Schedule referred to in these Letters Patent and making part of the same.

*To all whom it may concern:*

Be it known that I, WILLIAM H. HAWLEY, of the city of Utica, in the county of Oneida, in the State of New York, have invented certain Improvements in Axles and Shafts, of which the following is a specification.

Nature and Objects of my Invention.

My invention relates to the introduction, upon the arm of an axle or shaft, of iron or steel bearings, in combination with certain other bearings, of box or other metal or metals, in such a manner that the said iron or steel bearings shall protect the said box-metal bearings, the object of my invention being to secure and protect the axle or shaft-bearings made of box-metal, or other metal or metals, from being injured by breakage, loosening, abrasion, or any other injury resulting from the ordinary movements, and impingements, and percussion, and friction of the box or cover, which revolves upon the said axle, or within which the said axle or shaft revolves.

Description of the Accompanying Drawing.

General Description.

$a$ is the ordinary nut and screw.

E E is a section of the box which covers the skein or the axle.

A' A are metal bearings, usually made of box-metal. They may be made of Babbit's metal, or of bell-metal, or of copper alone, or of tin alone, or of zinc alone, or of the compounds of any two or more of these and other metals. These bearings are usually soldered or welded on to the axle or skein. I usually attach them to the said axle or skein by a process of casting.

The object of these bearings A' A is to diminish the amount of friction between the box E and the axle or skein, and also to prevent the cutting of the aforesaid box, which rests upon these bearings.

The application of these bearings to the axle and skein of road-carriages has already been secured by Letters Patent, granted to Ransom P. Gillette on the 30th day of September, 1862, for improvement in wagon-axles; and by further Letters Patent, granted to said Ransom P. Gillette on the 13th day of February, 1866, for vehicles, journals, and machinery; and by Letters Patent, granted to A. W. Gillette on the 1st day of January, 1867, for axles for vehicles.

My invention relates to the introduction of the iron bearings B B B B to support and protect the bearings A' A of the axle or skein.

Having purchased a certain interest in the aforementioned Letters Patent for several States of the United States, and having commenced the manufacture of the bearings described in said Letters Patent, and substantially described in this specification under the description of letters A' A, I found them practically worthless. The reason for this was, that after a few months' wear, the constant percussion, communicated, from the wheel, through the box E, upon the bearings A' A, either broke them off, or so damaged them that they had to be removed.

To remedy this defect, and to protect the bearings from injury, I invented the iron bearings B B B B. These are formed with the axle or skein, and constitute a part of it. They are narrower than the bearings A' A, and expose but a small friction-surface to the box E.

I cut these iron or steel bearings B B B B down to about the same height as the box-metal bearings A' A. I use four iron bearings, B B B B, in the construction of my carriage-axle, fig. 2. I place one of these iron or steel bearings on each side of and in juxtaposition with each of the bearings, marked A' A.

Figure 1:
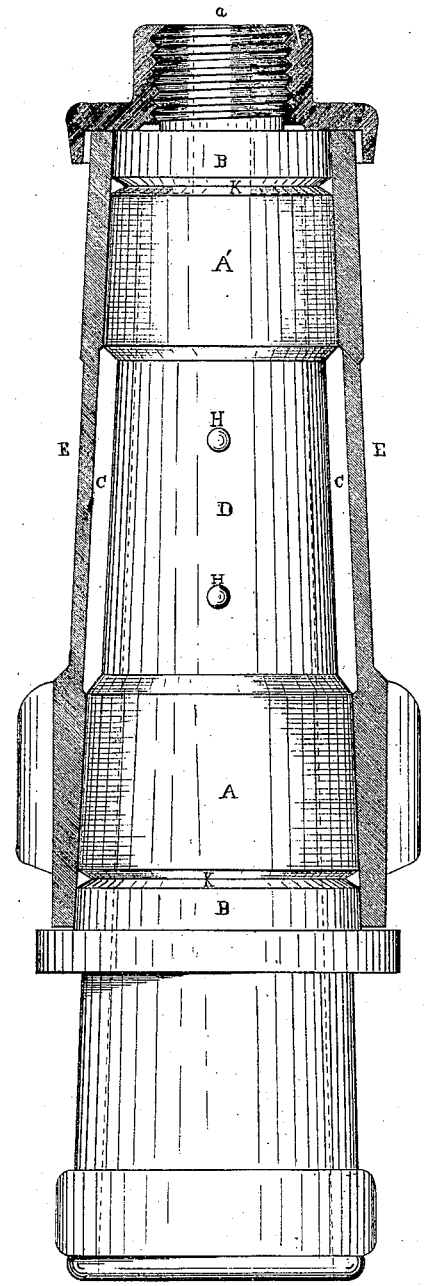
Figure 1 is a view of wagon-skein and section of box, exhibiting my invention as applied to skeins.

I use, at present, two iron or steel bearings, B B, in the construction of my wagon-skein, fig. 1. I place one of these on the end of the bearing A' nearest the nut and screw, and the other on the end of the bearing A nearest the shoulder of the skein. I, however, do not limit myself to the use of two or four iron or steel bearings, but claim the right, and as part of my invention, to use more or fewer of these iron or steel bearings, as experience shall dictate, to secure the end desired. Neither does your applicant restrict his invention to the axles or skeins of road-vehicles; but he claims, as part of his invention, and included under it, the right to apply my improvement and combination, and the application of the same to all sorts of shafts, and to all sorts of axles, whether used in machinery, or in steam-carriages, or in vehicles of any other description.

Figure 2:
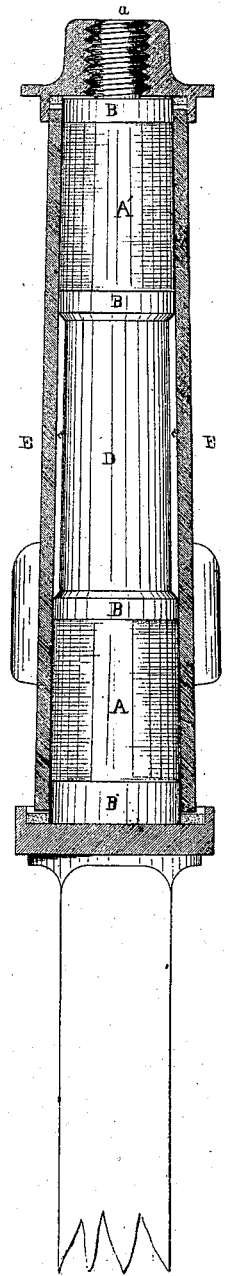
Figure 2 shows a section of axle-box, and gives a view of an axle embodying my invention as applied to axles or shafts.

The operation of my improvement is as follows:

In fig. 2, the carriage or vehicle being set in motion, the box E revolves upon the axle. The packing, made of cotton, or cloth, or other material, being wound around the arm D of the axle, and filling the space C, between the box E and the arm D, is saturated with oil. This oil lubricates the bearings A' A and B B B B. The weight of the carriage rests principally upon the bearings A' A, which are made quite broad. These bearings, being composed of box-metal, or of some metal or metals other than iron, do not cut or rapidly wear away the iron or steel box, but will wear for a long period of time, and the box revolves upon the axle with less friction than would be the case were all the bearings of iron or steel. The box E also rests upon the bearings B B B, which are made quite narrow, in order to present less friction-surface to the box E. These bearings, in practice, support the bearings A' A, and protect them from injury.

The axle of a carriage receives more or less percussion from the wheel passing over pavements, stones, or ruts, and any elevations or depression in the road; and the operation of these iron or steel bearings is, by their hardness, and toughness, and firmness, and thorough solidity, to protect the other bearings A' A from breakage and abrasion, or drawing, by concussion, or pounding, or from being otherwise injured.

In fig. 1, the wagon or heavy vehicle being set in motion, the method of operation of the iron bearings B B, and of the other bearings A' A, whose composition has heretofore been described, is substantially the same as that of the carriage-axle bearings. Nor will the operation of my improvement and combination, as applied to shafting, or to the axles of railroad-vehicles, or other carriages and vehicles, differ in substance from that heretofore described.

K K, fig. 1, are gutters turned in the wagon-skein, to catch any dirt which may work in from the outside, and to prevent this dirt from working on to the bearings A' A, and cutting their smooth surfaces.

H H, fig. 1, are teats, for holding the packing in its place.

Claim.

What I claim as my invention, and desire to secure by Letters Patent, is—

The combination of four or more, or fewer, iron or steel bearing, B B B B, upon all sorts of shafts, and upon all sorts of axles, whether used in machinery, or in carriages or vehicles of any sort whatsoever, with the metal bearings A' A, substantially as and for the purpose hereinbefore set forth.

WM. H. HAWLEY.

Witnesses:
WILLIAM H. PRATT,
ELIAKIM J. STODDARD.